(12) United States Patent
Sandoz et al.

(10) Patent No.: US 7,636,353 B2
(45) Date of Patent: Dec. 22, 2009

(54) METHOD AND SYSTEM FOR TRANSMITTING DATA OVER A NETWORK

(75) Inventors: Paul D. Sandoz, Grenoble (FR); Oleksiy Stashok, Prague (CZ)

(73) Assignee: Sun Microsystems, Inc., Santa Clara, CA (US)

( * ) Notice: Subject to any disclaimer, the term of this patent is extended or adjusted under 35 U.S.C. 154(b) by 565 days.

(21) Appl. No.: 11/635,335

(22) Filed: Dec. 7, 2006

(65) Prior Publication Data
US 2008/0101369 A1 May 1, 2008

(30) Foreign Application Priority Data
Oct. 2, 2006 (EP) .................. 06301004

(51) Int. Cl.
*G06F 7/22* (2006.01)
(52) U.S. Cl. .................. 370/389; 370/392; 709/227
(58) Field of Classification Search ............ 370/389, 370/392, 400, 401, 474; 709/227, 228, 236, 709/237
See application file for complete search history.

(56) References Cited

U.S. PATENT DOCUMENTS

| | | | | |
|---|---|---|---|---|
| 5,493,568 A | * | 2/1996 | Sampat et al. | 370/261 |
| 5,506,832 A | * | 4/1996 | Arshi et al. | 370/241 |
| 5,999,970 A | * | 12/1999 | Krisbergh et al. | 725/109 |
| 6,807,648 B1 | * | 10/2004 | Cansever et al. | 714/776 |
| 6,925,070 B2 | * | 8/2005 | Proctor, Jr. | 370/335 |
| 7,054,911 B1 | * | 5/2006 | Lango et al. | 709/213 |
| 7,478,160 B2 | * | 1/2009 | Jennings, III | 709/227 |
| 2005/0050549 A1 | | 3/2005 | Joseph et al. | |
| 2006/0112180 A1 | | 5/2006 | Vedula | |

FOREIGN PATENT DOCUMENTS

EP  1 667 399 A  6/2006
EP  1 667 404 A  6/2006

OTHER PUBLICATIONS

Extended European Search Report with opinion dated May 15, 2007 (8 pages).

* cited by examiner

*Primary Examiner*—Pankaj Kumar
*Assistant Examiner*—Duc T Duong
(74) *Attorney, Agent, or Firm*—Osha • Liang LLP

(57) ABSTRACT

A method for transmitting data that includes receiving a first request to open a first virtual channel, the first virtual channel associated with a TCP connection, and negotiating a first payload encoding scheme between a client and a server to use on the first virtual channel. The method further includes receiving a first frame from the client, the frame including a first channel-id associated with the first virtual channel and a first payload that includes a first datum encoded using the first payload encoding scheme. In addition, the method includes decoding the first payload to obtain a decoded first datum and processing the decoded first datum to obtain a second datum. The method additionally includes generating a second frame that includes the first channel-id and a second payload that includes the second datum encoded using the first payload encoding scheme, and sending the second frame to the client.

20 Claims, 5 Drawing Sheets

METHOD AND SYSTEM FOR TRANSMITTING DATA OVER A NETWORK

CROSS-REFERENCE TO RELATED APPLICATIONS

This application claims priority, under 35 U.S.C. §119, to European Patent Application No. 06301004.5 filed Oct. 2, 2006, entitled "METHOD AND SYSTEM FOR TRANSMITTING DATA OVER A NETWORK."

BACKGROUND

Network traffic, typically in the form of packets, is transmitted over a network, such as the Internet, from one computer system to another computer system. The content of the packets is initially generated by a process executing on the computer system initiating the transmission. This process generates and/or obtains the data to send to the other computer system (i.e., the receiving computer system). The data is then encoded using, for example, Extensible Markup Language (XML). The encoded data is then sent to the receiving computer system using one or more communication protocols, (e.g., HyperText Transfer Protocol (HTTP), Transmission Control Protocol (TCP) and Internet Protocol (IP)).

Prior to sending the encoded data to the receiving computer system, metadata is associated with the encoded data. The metadata corresponds to data that is required by the communication protocols. For example, if encoded data is sent using HTTP, one or more of the following pieces of metadata must accompany the encoded data: general-header data, request-header data, response-header data, and entity-header data. The various components associated with each of aforementioned headers are defined in Request for Comments (RFC) 2616—Hypertext Transfer Protocol—HTTP/1.1 (June 1999).

The receiving computer system, upon receipt of the encoded data and metadata, processes the encoded data using the metadata. Processing the encoded data typically includes sending the encoded data through the various layers (i.e., physical layer, network layer, transport layer, etc.) of the Open Systems Interconnection (OSI) model in the receiving computer system using the metadata, decoding the encoded data using the metadata, and performing the necessary actions on the data (i.e., the encoded data after it has been decoded) to generate a response.

Once the response has been generated, the receiving computer system performs the same steps described above with respect to the computer system initiating the transmission to send the response to the initiating computer system. Specifically, the receiving computer system encodes the response, generates the necessary metadata, and sends the metadata and the encoded response to the computer initiating the transmission using one or more communication protocols.

SUMMARY

In general, in one aspect, the invention relates to a method for transmitting data. The method includes receiving a first request to open a first virtual channel, wherein the first virtual channel is associated with a TCP connection and wherein the TCP connection is between a client and a server. The method further includes negotiating, between the client and the server, a first payload encoding scheme to use on the first virtual channel in response to the first request and receiving a first frame from the client. The first frame includes first frame comprises a first channel-id and a first payload, wherein the first channel-id is associated with the first virtual channel, and wherein the first payload comprises a first datum encoded using the first payload encoding scheme. The method further includes decoding the first payload to obtain a decoded first datum, processing the decoded first datum to obtain a second datum and generating a second frame. The second frame includes the first channel-id and a second payload, and wherein the second payload comprises the second datum encoded using the first payload encoding scheme. The method also includes sending the second frame to the client.

In general, in one aspect, the invention relates to a method for transmitting data. The method includes receiving a first frame from a client. The first frame consists of a channel-id, a first header, and a first payload component, and wherein the first payload component comprises a first payload. The method further includes determining a payload encoding scheme using the channel-id, decoding the first payload to obtain a first decoded payload using the payload encoding scheme, processing the first decoded payload to obtain a second payload, encoding the second payload using the payload encoding scheme to obtain an encoded second payload and generating a second frame. The second frame consists of the channel-id, a second header, and a second payload component, wherein the second payload component comprises the encoded second payload. The method also includes sending the second frame to the client.

In general, in one aspect, the invention relates to a method for transmitting data. The method includes receiving, by a server, a first frame from a client, wherein the first frame comprises a channel-id, a header, and a payload component, wherein the payload component comprises a first payload, wherein the channel-id is associated with a virtual channel operating over a transport layer protocol, wherein the first payload is encoded using a payload encoding scheme associated with a state, and wherein the state is associated with the channel-id. The method further includes obtaining the state associated with the channel-id, decoding the first payload to obtain a first decoded payload using the state, processing the first decoded payload to obtain a second payload, encoding the second payload using the payload encoding scheme defined in the state to obtain an encoded second payload, and generating a second frame. The second frame includes the encoded second payload. The method also includes sending the second frame to the client.

Other aspects of the invention will be apparent from the following description and the appended claims.

DETAILED DESCRIPTION

Figure 1:
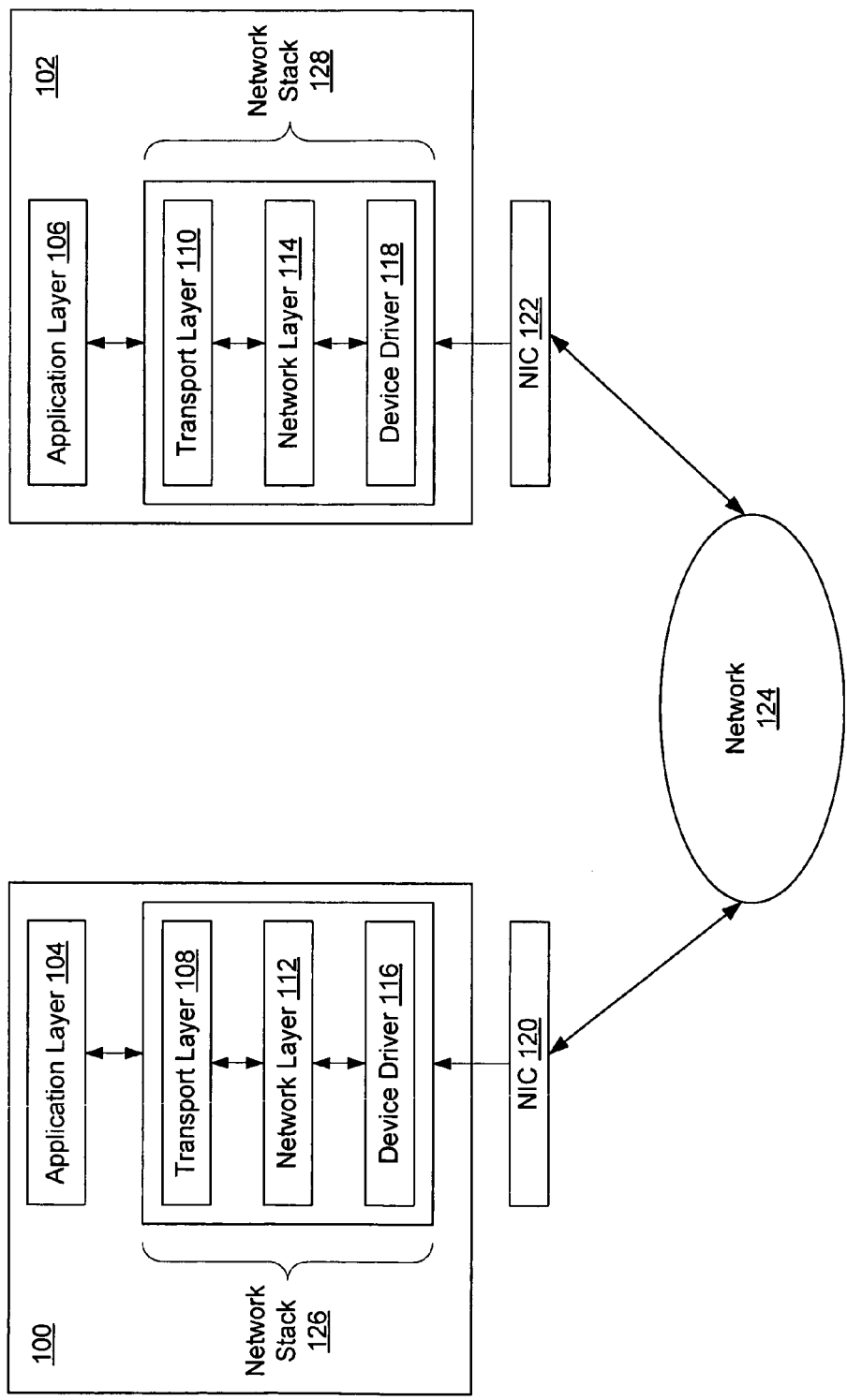
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for transmitting data over a network. More specifically, embodiments of the invention relate to negotiating payload encoding schemes between a client and a server prior to the transmission of data, thereby reducing the metadata transmitted with the data.

FIG. 1 shows a system in accordance with one or more embodiments of the invention. The system includes two computers (100, 102) connected over a network (124). In one embodiment of the invention, the network (124) may correspond to a local area network (LAN) or a wide area network (WAN). Further, the network (124) may be a wired network (e.g., the computers (100, 102) are physically connected together), a wireless network, or a combination thereof.

Each of the computers (100, 102) is connected to the network (124) via a network interface card (NIC) (120, 122). In one embodiment of the invention, each NIC (120, 122) is a piece of hardware operatively connected to the computer (100, 102) that includes functionality to send and receive network traffic.

In one embodiment of the invention, network traffic is transmitted in the form of packets, where each packet includes a header and a payload. The header includes metadata used to route and process the packet and the payload includes the actual data to be communicated to at least one other computer on the network (124).

The computers (100, 102) interact with the NICs (120, 122) via device drivers (116, 118). In one embodiment of the invention, each device driver (116, 118) is configured to expose the NIC (120, 122) to the computer (100, 102). Exposing the NICs (120, 122) to the computers (100, 102) includes providing application programming interfaces (APIs) to allow the computers (100, 102) to interact with the NICs (120, 122). Interacting with the NIC (120, 122) typically includes obtaining packets from the NIC (120, 122) and sending packets to the NIC (120, 122).

As shown in FIG. 1, each device driver (116, 118) is operatively connected to a network layer (112, 114). In one embodiment of the invention, the network layer (112, 114) is configured to perform network layer processing. Network layer processing corresponds to functionality to manage packet addressing and delivery on a network (e.g., functionality to support Internet Protocol (IP) (including, but not limited to, IPv4 and IPv6), Address Resolution Protocol (ARP), Internet Control Message Protocol (ICMP), etc.).

Further, as shown in FIG. 1, each network layer (112, 114) is operatively connected to a transport layer (108, 110). In one embodiment of the invention, the transport layer (108, 110) is configured to perform transport layer processing. Transport layer processing corresponds to functionality to manage the transfer of packets on the network (e.g., functionality to support Transmission Control Protocol (TCP), User Datagram Protocol (UDP), Stream Control Transmission Protocol (SCTP), etc.). The device driver (116, 118), the network layer (112, 114), and the transport layer (108, 110) may be collectively referred to as a network stack (126, 128).

In one embodiment of the invention, each network stack (126, 128) is operatively connected to an application layer (104, 106). In one embodiment of the invention, the application layer (104, 106) enables users to access the network via an application (not shown) executing on the computer (100, 102). Similar to the network layer (112, 114) and the transport layer (108, 110), the application layer (104, 106) also supports various application layer protocols. Some examples of application layer protocols include Telnet, File Transfer Protocol (FTP), Simple Mail Transfer Protocol (SMTP) and Hypertext Transfer Protocol (HTTP).

In one embodiment of the invention, one (or both) of the computers (100, 102) may include a web-service application. In one embodiment of the invention, the web-service application is configured to provide the connection management service. The connection management service may include functions to perform, for example, opening a TCP connection, opening one or more virtual channels (described below) on the TCP connection, negotiating which payload encoding schemes to use on a per-virtual channel basis, and assigning channel-identifiers (ids) to each of the virtual channels. Additional details about various functions performed by the connection management service are discussed below in FIG. 4.

In one embodiment of the invention, the functions included in the connection management service are defined using Web Service Description Language (WSDL) file. Further, an Extensible Markup Language (XML) Schema Definition (XSD) file is used to define all custom types (structures) used in the WSDL file. Example 1 and Example 2 below are examples of, respectively, a WSDL file and an associated XSD file defining a connection management service. Those skilled in the art will appreciate that the following files are provided for exemplary purposes only and accordingly should not be construed as limiting the scope of the invention in any way.

EXAMPLE 1

Connection Management Service WSDL File

```
<?xml version="1.0" encoding="UTF-8"?>
<definitions xmlns="http://schemas.xmlsoap.org/wsdl/"
xmlns:soap="http://schemas.xmlsoap.org/wsdl/soap/"
xmlns:tns="http://servicechannel.tcp.transport.ws.xml.sun.com/"
xmlns:xsd="http://www.w3.org/2001/XMLSchema"
targetNamespace="http://servicechannel.tcp.transport.ws.xml.sun.com/"
name="ServiceChannelWSImplService">
<types>
<xsd:schema>
<xsd:import namespace="http://servicechannel.tcp.transport.ws.xml.sun.com/"
schemaLocation="ServiceChannelWSImplService_schema1.xsd"/>
</xsd:schema>
</types>
<message name="initiateSession">
```

```
<part name="parameters" element="tns:initiateSession"/>
</message>
<message name="initiateSessionResponse">
<part name="parameters" element="tns:initiateSessionResponse"/>
</message>
<message name="closeSession">
<part name="parameters" element="tns:closeSession"/>
</message>
<message name="closeSessionResponse">
<part name="parameters" element="tns:closeSessionResponse"/>
</message>
<message name="openChannel">
<part name="parameters" element="tns:openChannel"/>
</message>
<message name="openChannelResponse">
<part name="parameters" element="tns:openChannelResponse"/>
</message>
<message name="ServiceChannelException">
<part name="fault" element="tns:ServiceChannelException"/>
</message>
<message name="closeChannel">
<part name="parameters" element="tns:closeChannel"/>
</message>
<message name="closeChannelResponse">
<part name="parameters" element="tns:closeChannelResponse"/>
</message>
<portType name="ServiceChannelWSImpl">
<operation name="initiateSession">
<input message="tns:initiateSession"/>
<output message="tns:initiateSessionResponse"/>
</operation>
<operation name="closeSession">
<input message="tns:closeSession"/>
<output message="tns:closeSessionResponse"/>
</operation>
<operation name="openChannel">
<input message="tns:openChannel"/>
<output message="tns:openChannelResponse"/>
<fault name="ServiceChannelException" message="tns:ServiceChannelException"/>
</operation>
<operation name="closeChannel">
<input message="tns:closeChannel"/>
<output message="tns:closeChannelResponse"/>
</operation>
</portType>
<binding name="ServiceChannelWSImplPortBinding"
type="tns:ServiceChannelWSImpl">
<soap:binding transport="http://schemas.xmlsoap.org/soap/http" style="document"/>
<operation name="initiateSession">
<soap:operation soapAction=""/>
<input>
<soap:body use="literal"/>
</input>
<output>
<soap:body use="literal"/>
</output>
</operation>
<operation name="closeSession">
<soap:operation soapAction=""/>
<input>
<soap:body use="literal"/>
</input>
<output>
<soap:body use="literal"/>
</output>
</operation>
<operation name="openChannel">
<soap:operation soapAction=""/>
<input>
<soap:body use="literal"/>
</input>
<output>
<soap:body use="literal"/>
</output>
<fault name="ServiceChannelException">
<soap:fault name="ServiceChannelException" use="literal"/>
</fault>
</operation>
<operation name="closeChannel">
```

-continued

```
<soap:operation soapAction=""/>
<input>
<soap:body use="literal"/>
</input>
<output>
<soap:body use="literal"/>
</output>
</operation>
</binding>
<service name="ServiceChannelWSImplService">
<port name="ServiceChannelWSImplPort"
binding="tns:ServiceChannelWSImplPortBinding">
<soap:address location="tcp://CHANGED_BY_RUNTIME"/>
</port>
</service>
</definitions>
```

EXAMPLE 2

Connection Management Service XSD File

```
<?xml version="1.0" encoding="UTF-8"?>
<xs:schema xmlns:xs="http://www.w3.org/2001/XMLSchema"
xmlns:tns="http://servicechannel.tcp.transport.ws.xml.sun.com/" version="1.0"
targetNamespace="http://servicechannel.tcp.transport.ws.xml.sun.com/">
<xs:element name="ServiceChannelException" type="tns:ServiceChannelException"/>
<xs:element name="closeChannel" type="tns:closeChannel"/>
<xs:element name="closeChannelResponse" type="tns:closeChannelResponse"/>
<xs:element name="closeSession" type="tns:closeSession"/>
<xs:element name="closeSessionResponse" type="tns:closeSessionResponse"/>
<xs:element name="initiateSession" type="tns:initiateSession"/>
<xs:element name="initiateSessionResponse" type="tns:initiateSessionResponse"/>
<xs:element name="openChannel" type="tns:openChannel"/>
<xs:element name="openChannelResponse" type="tns:openChannelResponse"/>
<xs:complexType name="initiateSession"/>
<xs:complexType name="initiateSessionResponse">
<xs:sequence>
<xs:element name="return" type="xs:int"/>
</xs:sequence>
</xs:complexType>
<xs:complexType name="closeChannel">
<xs:sequence>
<xs:element name="arg0" type="xs:int"/>
</xs:sequence>
</xs:complexType>
<xs:complexType name="closeChannelResponse">
<xs:sequence>
<xs:element name="return" type="xs:int"/>
</xs:sequence>
</xs:complexType>
<xs:complexType name="closeSession"/>
<xs:complexType name="closeSessionResponse">
<xs:sequence>
<xs:element name="return" type="xs:int"/>
</xs:sequence>
</xs:complexType>
<xs:complexType name="openChannel">
<xs:sequence>
<xs:element name="channelSettings" type="tns:channelSettings" minOccurs="0"/>
</xs:sequence>
</xs:complexType>
<xs:complexType name="channelSettings">
<xs:sequence>
<xs:element name="negotiatedMimeTypes" type="tns:mimeType" nillable="true"
maxOccurs="unbounded" minOccurs="0"/>
<xs:element name="negotiatedParams" type="xs:string" nillable="true"
maxOccurs="unbounded" minOccurs="0"/>
<xs:element name="targetWSURI" type="xs:string" minOccurs="0"/>
<xs:element name="channelId" type="xs:int"/>
<xs:element name="wsServiceName" type="xs:QName" minOccurs="0"/>
</xs:sequence>
</xs:complexType>
<xs:complexType name="mimeType">
```

-continued

```
<xs:sequence>
<xs:element name="mimeType" type="xs:string" minOccurs="0"/>
<xs:element name="embeddedParams">
<xs:complexType>
<xs:sequence>
<xs:element name="entry" minOccurs="0" maxOccurs="unbounded">
<xs:complexType>
<xs:sequence>
<xs:element name="key" minOccurs="0" type="xs:string"/>
<xs:element name="value" minOccurs="0" type="xs:string"/>
</xs:sequence>
</xs:complexType>
</xs:element>
</xs:sequence>
</xs:complexType>
</xs:element>
</xs:sequence>
</xs:complexType>
<xs:complexType name="openChannelResponse">
<xs:sequence>
<xs:element name="return" type="tns:channelSettings" minOccurs="0"/>
</xs:sequence>
</xs:complexType>
<xs:complexType name="ServiceChannelException">
<xs:sequence>
<xs:element name="message" type="xs:string" minOccurs="0"/>
</xs:sequence>
</xs:complexType>
</xs:schema>
```

Continuing with the discussion of FIG. 1, another computer (100, 102) connected via the network (124) to the computer (100, 102) with the web-service application may use the Simple Object Access Protocol (SOAP) to call functions defined in the WSDL file (e.g., initiateSession, openChannel, etc.).

In one embodiment of the invention, the computer (100, 102) calling the aforementioned functions uses an application layer protocol. In one embodiment of the invention, the application layer protocol defines a frame for transmitting data over the network (124). The frame is described in detail in relation to FIGS. 2 and 3A-3I below. Once the frame has been created in the application layer (104, 106), the frame is sent to the network stack (126, 128). Once the network stack (126, 128) has received the frame, the various layers in the network stack (126, 128), namely the transport layer (108, 110) and the network layer (112, 114) append additional headers to the frame (e.g., a TCP header, an IP header, a Media Access Control (MAC) address, etc.) to form a packet.

Once the network stack (126, 128) has completed processing the frame, the result is a packet that includes a header and a payload. The header includes a header component from the network layer (e.g., an IP header), a header component from the transport layer, and, typically, a MAC address. The payload includes the frame obtained from the application layer. At this stage, the packet may be transmitted over the network (124) to the destination computer as identified in the header (i.e., the header of the packet).

Figure 2:
FIG. 2 shows a frame in accordance with one or more embodiments of the invention.

FIG. 2 shows a frame in accordance with one embodiment of the invention. As shown in FIG. 2, the frame (200) includes three components: a channel-id (202), a header (204), and a payload component (206). In one embodiment of the invention, the channel-id (202) denotes a virtual channel with which the frame (206) is associated. In one embodiment of the invention, each virtual channel corresponds to a particular data path operating over a transport layer connection between a client and a server. Further, only frames with the corresponding channel-id (i.e., the channel-id associated with the virtual channel) may be communicated on the virtual channel.

Continuing with the discussion of FIG. 2, the header (204) includes the metadata associated with the frame (200). In one embodiment of the invention, the application layer protocol defines the follow types of headers: message header (see FIG. 3A), message-start-chunk header (see FIG. 3B), message-chunk header (see FIG. 3C), message-end-chunk header (see FIG. 3D), error header (see FIG. 3E), and Null header (see FIG. 3F). Each of the aforementioned types of headers is discussed below in relation to the referenced Figures.

Continuing with the discussion of FIG. 2, the payload component (206) corresponds to the data being communicated over the network (124) as opposed to the metadata (e.g., channel-id (202) and header (204)). Said another way, the payload component (206) includes the data (i.e., payload) to be sent over the network while the channel-id (202) and header (204) correspond to metadata required to send the payload component (206) over the network (124) and to enable the receiving computer to process the data in the payload component (206). Additional details about the payload component (206) are described below in relation to FIG. 3I.

Figure 3A:
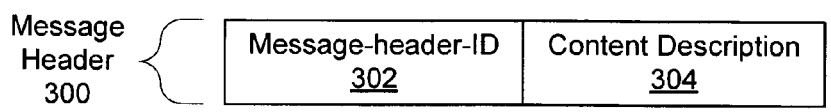
FIGS. 3A-3I show various components of a frame in accordance with one or more embodiments of the invention.

The following discussion describes FIGS. 3A-3I. FIG. 3A shows a message header (300) in accordance with one embodiment of the invention. The message header (300) includes a message-header-id (302) and a content description (304). The content description (304) is described below in relation to FIG. 3G. In one embodiment of the invention, the message-header-id (302) is a number used to denote that the payload component (206 in FIG. 2) is not part of a larger piece of data. Said another way, the number denotes that the data to be transmitted combined with the channel-id (202 in FIG. 2) and the header (204 in FIG. 2) does not exceed a maximum frame size (i.e., the maximum length, in bytes, of the frame). If the data to be transmitted combined with the channel-id (202 in FIG. 2) and the header (204 in FIG. 2) exceeds the maximum frame size, then the data to be transmitted is divided into chunks.

Figure 3B:
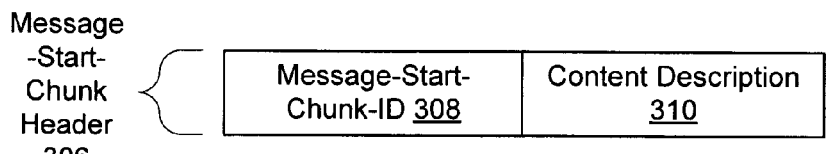
Figure 3C:
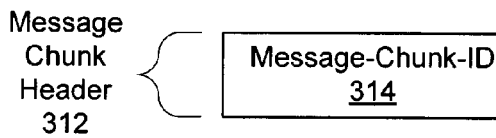
Figure 3D:
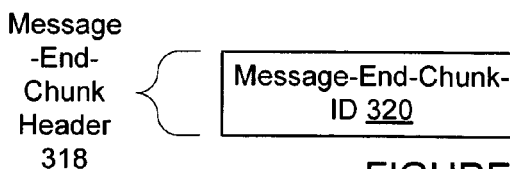

FIGS. 3B-3D show the various headers required to transmit as chunks. FIG. 3B shows a message-start-chunk header (306) in accordance with one embodiment of the invention. The message-start-chunk header (306) includes a message-start-chunk-id (308) and a content description (310) (described below in relation to FIG. 3G). In one embodiment of the invention, the message-start-chunk-id (308) is a number used to denote the first frame in a series of frames where the frames are all transmitting chunks of a larger piece of data. For example, if the data is 15K and the maximum frame size is 4K, then 4 frames must be sent over the network in order to transmit the entire 15K. In this scenario, the first of the four frames includes the message-start-chunk-id (308).

FIG. 3C shows a message chunk header (312) in accordance with one embodiment of the invention. The message chunk header (312) includes a message-chunk-id (314). In one embodiment of the invention, the message-chunk-id (314) is a number used to denote that the frame corresponds to a frame that is sent after the first frame and before the last frame in a series of frames, where the frames are all transmitting chunks of a larger piece of data. For example, if the data is 15K and the maximum frame size is 4K, then 4 frames must be sent over the network in order to transmit the entire 15K. In this scenario, the second and third frames include the message-chunk-id (314).

FIG. 3D shows a message-end-chunk header (318) in accordance with one embodiment of the invention. The message-end-chunk header (318) includes a message-end-chunk-id (320). In one embodiment of the invention, the message-end-chunk-id (320) is a number used to denote the last frame in a series of frames where the frames are all transmitting chunks of a larger piece of data. For example, if the data is 15K and the maximum frame size is 4K, then 4 frames must be sent over the network in order to transmit the entire 15K. In this scenario, the last of the four frames includes the message-end-chunk-id (320).

Figure 3E:
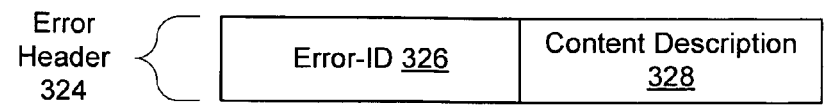

FIG. 3E shows an error header (324) in accordance with one embodiment of the invention. In one embodiment of the invention, the error header (324) includes an error-id (326) and a content description (328). The error-id (326) is a number that denotes a specific error, for example, web service not found. The content description (328) is described below in relation to FIG. 3G.

Figure 3F:
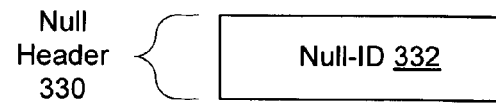

FIG. 3F shows a null header (330) in accordance with one embodiment of the invention. The null header (330) includes a null-id (332). In one embodiment of the invention, the null-id denotes that the frame (200 in FIG. 2) includes Null data in the payload component (206 in FIG. 6). The null header (300) is typically used to respond to a request, where the request does not require a response.

As discussed above, each of the aforementioned header types includes an id (e.g., message-header-id (302), message-start-chunk-id (308), message-chunk-id (314), message-end-chunk-id (320), error-id (326), null-id (332)). As discussed above, each of the aforementioned ids are used to denote the type of header in the frame. Accordingly, the header in each frame includes a message-id, which corresponds to one of the aforementioned ids. For example, a message-id of "0" in a frame may denote that the header is message header. In this example, the header in the frame conforms to the message header shown in FIG. 3A. Similarly, a message-id of "2" in a frame may denote that the header is a message-chunk-header. In this example, the header in the frame conforms to the message-chunk-header shown in FIG. 3C.

Figure 3G:
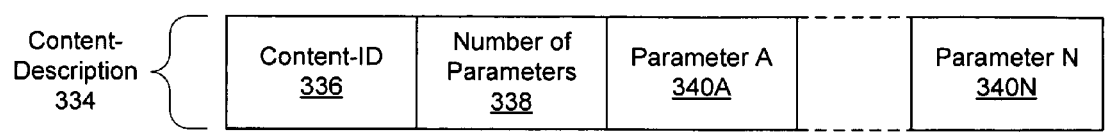

FIG. 3G shows a content description (334) in accordance with one or more embodiments of the invention. As shown in FIG. 3G, the content description (334) includes a content-id (336), a number of parameters (338) field, and zero or more parameters (340A, 340N).

In one embodiment of the invention, the content-id (336) is a number that denotes the payload encoding scheme used to encode that payload in the payload component (206 in FIG. 2). For example, a content-id (336) of "1" may denote that the payload is encoded using XML and a content-id (336) of "4" may denote that the payload is encoded using Fast Infoset. In one embodiment of the invention, the number of parameters (338) field includes a number that denotes the number of parameters that are in the content description (334). If there are no parameters in the content description (334), then the number of parameters (338) field is "0." Parameters (340A, 340N) are discussed in relation to FIG. 3H.

Figure 3H:
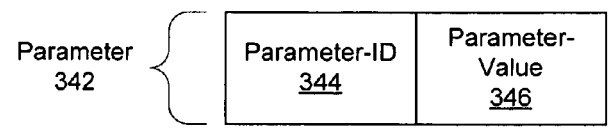

FIG. 3H shows a parameter (342) in accordance with one embodiment of the invention. Each parameter (342) includes a parameter-id (344) and a parameter value (346). In one embodiment of the invention, the parameter-id (344) is a number that identifies a particular parameter. For example, a parameter-id (344) of "1" may denote that the parameter-value is a charset (e.g., UTF-16) and a parameter-id (344) of "2" may denote that the parameter-value is a version (e.g., version 2). The parameter-value (346) is a value of a parameter denoted by the parameter-id (344). For example, if the parameter-id (344) is "1", then parameter-value may be "UTF-16."

Figure 3I:
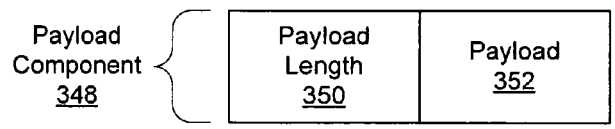

FIG. 3I shows a payload component (348) in accordance with one embodiment of the invention. As shown in FIG. 3I the payload component (348) includes a payload length (350) and the payload (352). In one embodiment of the invention, the payload length (350) specifies the length (for example, in bytes) of the payload (352). The payload (352) corresponds to the data, typically encoded, that is being transmitted in the frame (200 in FIG. 2).

As discussed above, there are many types of ids (e.g., channel-id (202), message-header-id (302), message-start-chunk-id (308), message-chunk-id (314), message-end-chunk-id (320), error-id (326), null-id (332), content-id (336), and parameter-id (342)) present in the frame (200 in FIG. 2). In one embodiment of the invention, the aforementioned ids used in the frames may be: (i) negotiated and/or established prior to opening a virtual channel; (ii) negotiated and/or established during the opening of a virtual channel; and/or (iii) negotiated and/or established after opening a virtual channel.

In one embodiment of the invention, negotiating and/or establishing the aforementioned ids prior to opening a virtual channel may correspond to including the ids (and what the ids represent) as part of the connection management service. As the ids (and/or what the ids represent) change over time, the connection management service may be updated. In one embodiment of the invention, each time one or more ids are changed, the version of the connection management service is updated.

In one embodiment of the invention, negotiating and/or establishing the aforementioned ids during the opening of a virtual channel may correspond to one or both endpoints of the virtual channel (e.g., the client and the server) sending and/or agreeing on the ids (and what the ids represent) prior to sending frames over the virtual channel. As such, the aforementioned endpoints may use initially agreed upon (or previously established) ids while negotiating and/or establishing new ids (and what the ids represent) for the virtual channel.

Finally, once the virtual channel is open and in use, the endpoints of the virtual channel may negotiate (over the virtual channel or service channel (discussed below)) modifications (i.e., additions, changes, deletions) to the current set of ids being used for frames transmitted over the virtual channel.

In one embodiment of the invention, the ids (and what the ids represent) may be collectively referred to as an encoding/decoding vocabulary. Further, in one embodiment of the invention, there may be one encoding/decoding vocabulary for each virtual channel (or group of virtual channels).

In one embodiment of the invention, the layout of each frame (i.e., the components of the frame as shown in FIGS. 2 and 3A-3I) is defined using a grammar (e.g., a Backus-Naur Form (BNF) grammar). In one embodiment of the invention, the layout of each frame may be modified by changing the grammar. Further, each change (or set of changes) to the aforementioned grammar may result in a new version of the grammar and be associated with a framing version (i.e., a number used to identify the version of the grammar).

Example 3 is an example of a frame that includes a message header. Those skilled in the art will appreciate that the following frame is provided for exemplary purposes only and accordingly should not be construed as limiting the scope of the invention in any way.

EXAMPLE 3

Example of a frame with a Message Header

| 10 11 10 00 05 55 | 54 46 2D 38 F6 21 E0 00 |
|---|---|
| 00 01 00 38 CF 00 53 28 | 68 74 74 70 3A 2F 2F 73 |
| 63 68 65 6D 61 73 2E 78 | 6D 6C 73 6F 61 70 2E 6F |
| 72 67 2F 73 6F 61 70 2F | 65 6E 76 65 6C 6F 70 65 |
| 2F F0 3F 81 81 07 45 6E | 76 65 6C 6F 70 65 3F 81 |
| 81 03 42 6F 64 79 38 CD | 1B 68 74 74 70 3A 2F 2F |
| 65 78 61 6D 70 6C 65 2E | 6F 72 67 2F 6D 74 6F 6D |
| 2F 64 61 74 61 F0 3D 82 | 05 44 65 74 61 69 6C 3D |

Referring to Example 3, the highlighted portion of the frame corresponds to the channel-id, header, and payload length. The remaining portion of the frame corresponds to the encoded payload. With respect to the highlighted portion, the channel-id is 1, the message-id is 0 (denoting the header is a message header), the content-id is 1, the number-of-parameters is 1, the parameter-id is 1, the parameter-value is UTF-8, and the payload-length is 4342. In this example, the content-id of "1" denotes that the payload is encoded using SOAP version 1.1. Further, the parameter-id of "1" denotes that the parameter-value identifies a charset, which in this example is UTF-8.

Examples 4A-4C show an example of message chunking in accordance with one embodiment of the invention. Those skilled in the art will appreciate that the following example frames are provided for exemplary purposes only and accordingly should not be construed as limiting the scope of the invention in any way.

For the purposes of this example, assume that a 20K piece of data must be sent across a virtual channel, where the maximum frame size is 8K. Accordingly, the following three frames are sent across the virtual channel.

EXAMPLE 4A

First Frame

| | 11 50 F1 3F E0 00 |
|---|---|
| 00 01 00 38 CF 00 53 28 | 68 74 74 70 3A 2F 2F 73 |
| 63 68 65 6D 61 73 2E 78 | 6D 6C 73 6F 61 70 2E 6F |
| 72 67 2F 73 6F 61 70 2F | 65 6E 76 65 6C 6F 70 65 |
| 2F F0 3F 81 81 07 45 6E | 76 65 6C 6F 70 65 3F 81 |
| 81 03 42 6F 64 79 38 CD | 1B 68 74 74 70 3A 2F 2F |
| 65 78 61 6D 70 6C 65 2E | 6F 72 67 2F 6D 74 6F 6D |
| 2F 64 61 74 61 F0 3D 82 | 05 44 65 74 61 69 6C 3D |

Referring to Example 4A, the highlighted portion of the frame corresponds to the channel-id, header, and payload length. The remaining portion of the frame corresponds to the encoded payload. With respect to the highlighted portion, the channel-id is 1, the message-id is 1 (denoting that the header is a message-start-chunk header), the content-id is 5 (denoting that the payload is encoded using SOAP Message Transmission Optimization Mechanism), the number-of-parameters is 0, and the payload-length is 8177.

EXAMPLE 4B

Second Frame

| | 12 F2 1F 8F E5 F6 24 1E 78 AB |
|---|---|
| 17 2A D7 96 CB 2D BC 7E | 6A BC 7B 24 5E E8 47 3C |
| FF 00 4A AD 6D 22 5E 59 | B7 DB D7 6C 30 FC DE 7F |
| F1 FB 01 DC E6 AE 40 2C | EE E1 F2 DA 4F B1 29 C4 |
| 8A 83 E6 04 11 8E A6 88 | 7B CD EB A3 26 7E EA 5A |
| 6C 67 C7 65 79 1D BA C5 | 2D B4 AB B5 B7 6F 5E A2 |
| A2 B9 22 46 DF FC 41 B6 | 11 B7 B5 74 B2 47 0D 82 |
| C0 8C D3 BF 99 91 BB 8F | D7 D6 B9 B9 24 76 DF 13 |

Referring to Example 4B, the highlighted portion of the frame corresponds to the channel-id, header, and payload length. The remaining portion of the frame corresponds to the encoded payload. With respect to the highlighted portion, the channel-id is 1, the message-id is 2 (denoting that the header is a message-chunk header), and the payload-length is 8178.

EXAMPLE 4C

Third Frame

| | 13 EB 1E B7 66 |
|---|---|
| 91 E8 82 25 5D AC BF 3A | E1 AA 4B 48 9A 4B 95 55 |
| F9 7E 6C 65 BA 63 DE 88 | F6 F9 8C DF 77 7A 83 8F |
| E7 FA D1 07 DD DA AB F3 | 16 FC 6A A0 BE 12 64 F7 |
| 37 2E EF 53 EC FB 6D DB | 9D DB 50 FB E3 AF E1 59 |
| 91 F9 F2 24 D6 EB FF 00 | 5D 25 3D CF B5 43 2B E5 |
| 97 62 E4 06 CE FE D5 66 | 3B D5 6B 79 12 5F 91 5D |
| 78 3D 48 15 BC A6 A7 2D | 59 94 63 CA B4 44 3F D9 |
| E9 34 76 FB A5 F9 76 9E | 5B 8D B9 27 19 A9 5B EC |
| F1 DE 5B AB FD C4 8D D4 | F9 52 60 9C 1C F7 1C D5 |

Referring to Example 4C, the highlighted portion of the frame corresponds to the channel-id, header, and payload length. The remaining portion of the frame corresponds to the encoded payload. With respect to the highlighted portion, the channel-id is 1, the message-id is 3 (denoting that the header is a message-end-chunk header), and the payload-length is 3902.

In one embodiment of the invention, if multiple virtual channels are open on a single TCP connection and a large piece is being transmitted over one of the virtual channels using chunking (see, e.g., Examples 4A-4C), all other frames on all other virtual channels are blocked until all of the frames that include chunks of the large piece of data have been transmitted over the virtual channel. Said another way, no interleaving of frames associated with different pieces of data exists. For example, once the frame in Example 4A has been transmitted over channel 1 on the TCP connection, all other frames for all other virtual channels of the TCP connection are blocked until the frame in Example 4C has been transmitted.

Figure 4:
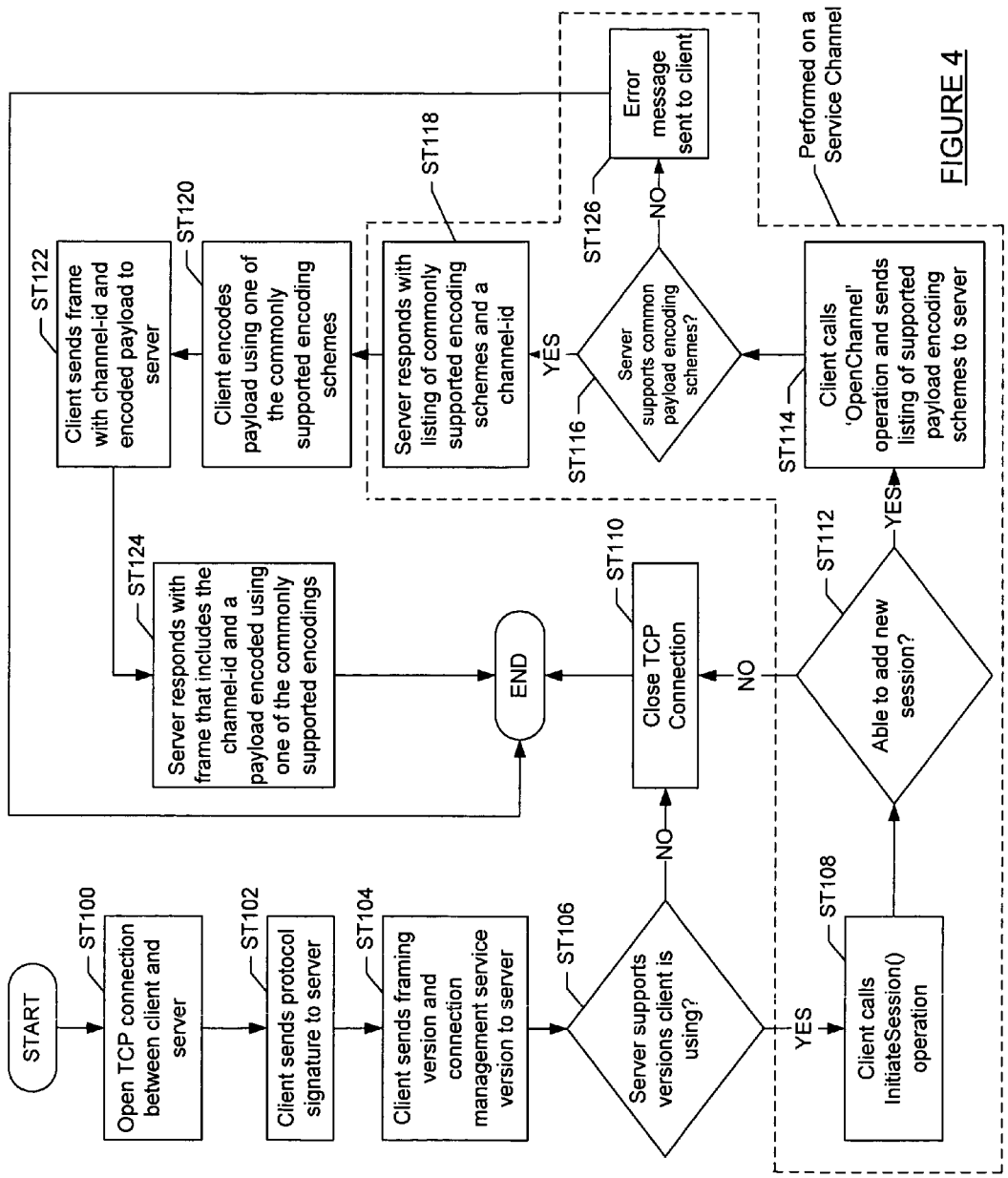
FIG. 4 shows a flowchart in accordance with one or more embodiments of the invention.

FIG. 4 shows a flowchart in accordance with one embodiment of the invention. More specifically, FIG. 4 shows a method for opening a virtual channel in accordance with one embodiment of the invention. In embodiments of the invention, one or more of the steps described below may be omitted, repeated, and/or performed in a different order. Accordingly, the specific arrangement of steps shown in FIG. 4 should not be construed as limiting the scope of the invention.

Initially, a TCP connection is opened between the client and the server (ST 100). Once the TCP connection is open, the client sends a protocol signature to the server (ST102). In one embodiment of the invention, the protocol signature indicates to the server that the client wishes to use the application layer protocol discussed in FIGS. 2 and 3A-3I. The client then sends information about the framing version and connection management service version the client is currently using (ST104). In one embodiment of the invention, the framing version corresponds to the current version of the grammar used to define the layout of each frame. In one embodiment of the invention, the connection management service version corresponds to the version of the connection management service that is currently being used by the client. In one embodiment of the invention, the version of the connection management service that is currently being used by the client includes a listing of ids (and what the ids represent) (discussed above), the WSDL file (and, if necessary, the XSD file) defining the connection management service (discussed above), and other code used to interact with the connection management service.

Continuing with the discussion of FIG. 4, upon receipt of the framing version and connection management service version from the client, a determination is made about whether the server supports the versions the client is currently using (ST106). If the server does not support the versions the client is currently using, then the TCP connection (i.e., the TCP connection opened in ST100) is closed (ST110). Alternatively, if the server supports the versions the client is currently using, the server sends back an acknowledgement of the aforementioned versions (not shown). The process then proceeds to ST108.

In ST108, the client calls an initiateSession operation on the server. In one embodiment of the invention, the initiateSession operation is defined in a WSDL file. Further, the initiateSession operation is called using SOAP. Upon receipt of the initiateSession operation call from the client, the server determines whether the server is able to open a session (i.e., whether the TCP connection may be used to open a virtual channel(s)) (ST112). In one embodiment of the invention, the aforementioned determination is made based on the server's session limitations. For example, the server may limit the total number of open sessions, a total number of open sessions for a given client, or any combination thereof.

If the server determines that a session may not be opened, the process proceeds to ST110. Alternatively, if the server determines that a session may be opened, the server sends back a response indicating that a session has been opened by the client (not shown). The process then proceeds to ST114. In ST114, the client calls an openChannel operation and sends, with the aforementioned call or after the aforementioned call, a listing of payload encoding schemes supported by the client. Examples of payload encoding schemes include Fast Infoset, XML, and SOAP Message Transmission Optimization Mechanism. Those skilled in the art will appreciate that other encoding schemes may be used.

Upon receipt of the listing of payload encoding schemes from the client, the server determines whether the server accepts the opening of a new virtual channel and supports any of the payload encoding schemes identified in the listing of payload encoding schemes (ST116). In one embodiment of the invention, the aforementioned determination is made based on the server's virtual channel limitations. For example, the server may limit the total number of open virtual channels, the total number of open virtual channels for a given TCP connection, a total number of open virtual channels for a given client, or any combination thereof.

If the server does not accept the opening of a new virtual channel or does not support any of the payload encoding schemes in the listing of payload encoding schemes (i.e., there are no common payload encoding schemes), the process proceeds to ST126. In ST126, the server sends an error message to the client indicating that the a virtual channel has not been opened. In one embodiment of the invention, the error message may include additional information identifying the reason(s) why the virtual channel was not opened. In one embodiment of the invention, if there are no other open virtual channels on the TCP connection, ST126 may also include closing the TCP connection.

Alternatively, if the server accepts the opening of a new virtual channel and supports one or more payload encoding schemes in the listing of payload encoding schemes, the server sends a listing of commonly supported payload encoding schemes and a channel-id to the client (ST118). In one embodiment of the invention, the channel-id uniquely identifies a virtual channel on the TCP connection (i.e., the TCP connection opened in ST100).

At this stage, the client may now begin transmitting frames over the virtual channel (i.e., the virtual channel associated with the channel-id received from the server). In ST120, the client encodes a payload to send to the server. In one embodiment of the invention, the payload in the frame is encoded using one of the payload encoding schemes specified in the listing of commonly supported payload encoding schemes. In one embodiment of the invention, one or more payload encoding schemes may, by default, be supported by both the client and the server (e.g., XML). For the default payload encoding schemes, the client and the server may not need to negotiate support. Those skilled in the art will appreciate that the default payload encoding schemes may be different for each of the connection management service versions.

The client then sends a frame to the server (ST122). The frame includes the aforementioned channel-id and encoded payload. The server, upon receipt of the frame, generates a response, encodes the response to obtain an encoded payload, and sends the encoded payload and channel-id in a frame to the client (ST124). In one embodiment of the invention, the payload in the frame is encoded using one of the payload encoding schemes specified in the listing of commonly supported payload encoding schemes. In one embodiment of the invention, one or more payload encoding schemes may, by default, be supported by both the client and the server (e.g., XML). For the default payload encoding schemes, the client and the server may not need to negotiate support. Those skilled in the art will appreciate that the default payload encoding schemes may be different for each of the connection management service versions.

ST114-ST118 may be repeated for each new virtual channel on an open TCP connection. Further, ST120-ST124 may be repeated once the virtual channel has been opened.

As shown in FIG. 4, ST108-ST118 and ST126 are performed on a service channel. In one embodiment of the invention, the service channel corresponds to dedicated virtual channel that is used to open virtual channels on a TCP connection. In one embodiment of the invention, there is one service channel for each TCP connection. Those skilled in the art will appreciate that ST122 and/or ST124 may be slightly modified to when using the frames to send individual chunks of a large piece of data (see Example 4A-4C).

In one embodiment of the invention, the grammar defining the layout of the frames, the encoding/decoding vocabulary, and the listing of commonly supported payload encoding schemes may be collective referred to as a state. In one embodiment of the invention, a state is associated with each virtual channel (or group of channels).

Examples 5A-5H below further explain the method shown in FIG. 4 in accordance with one embodiment of the invention. Those skilled in the art will appreciate that the following examples are provided for exemplary purposes only and accordingly should not be construed as limiting the scope of the invention in any way.

Initially, the client opens a TCP connection with the server and then sends a 5 byte protocol signature to the server. The client subsequently sends the framing version and the connection management service version to the client.

EXAMPLE 5A

Framing Version and Connection Management Service Version 10 10

Referring to Example 5A, the client is using framing version 1.0 and connection management service version 1.0. Note that the framing version and the connection management service version are represented in an indefinite length encoding of a non-negative number.

The server receives the framing version and the connection management service version and, in this case, accepts the framing version and the connection management service version of the client. The acceptance is conveyed to the client by the following data.

EXAMPLE 5B

Acceptance by Server of Framing Version and Connection Management Service Version 01 01 00

Referring to Example 5B, the server returns the server's versions: framing version 1.0 and connection management service version 1.0. In addition, the server returns an acceptance—denoted as "00."

The client subsequently calls the initiateSession operation on the server. The following frame includes the aforementioned call.

EXAMPLE 5C

Frame Including Call to the initiateSession Operation

| | | | | | | | | | | | | |
|---|---|---|---|---|---|---|---|---|---|---|---|---|
| 00 | 10 | CA | 03 | 3C | 3F | 78 | 6D | 6C | 20 | 76 | 65 | 72 73 69 6F |
| 6E | 3D | 22 | 31 | 2E | 30 | 22 | 20 | 3F | 3E | 3C | 53 | 3A 45 6E 76 |
| 65 | 6C | 6F | 70 | 65 | 20 | 78 | 6D | 6C | 6E | 73 | 3A | 53 3D 22 68 |
| 74 | 74 | 70 | 3A | 2F | 2F | 73 | 63 | 68 | 65 | 6D | 61 | 73 2E 78 6D |
| 6C | 73 | 6F | 61 | 70 | 2E | 6F | 72 | 67 | 2F | 73 | 6F | 61 70 2F 65 |
| 6E | 76 | 65 | 6C | 6F | 70 | 65 | 2F | 22 | 3E | 3C | 53 | 3A 42 6F 64 |
| 79 | 3E | 3C | 6E | 73 | 32 | 3A | 69 | 6E | 69 | 74 | 69 | 61 74 65 53 |
| 65 | 73 | 73 | 69 | 6F | 6E | 20 | 78 | 6D | 6C | 6E | 73 | 3A 6E 73 32 |
| 3D | 22 | 68 | 74 | 74 | 70 | 3A | 2F | 2F | 73 | 65 | 72 | 76 69 63 65 |
| 63 | 68 | 61 | 6E | 6E | 65 | 6C | 2E | 74 | 63 | 70 | 2E | 74 72 61 6E |
| 73 | 70 | 6F | 72 | 74 | 2E | 77 | 73 | 2E | 78 | 6D | 6C | 2E 73 75 6E |
| 2E | 63 | 6F | 6D | 2F | 22 | 2F | 3E | 3C | 2F | 53 | 3A | 42 6F 64 79 |
| 3E | 3C | 2F | 53 | 3A | 45 | 6E | 76 | 65 | 6C | 6F | 70 | 65 3E |

Referring to Example 5C, the highlighted portion of the frame corresponds to the channel-id, header, and payload length. The remaining portion of the frame corresponds to the encoded payload, which includes the call to the initiateSession operation. With respect to the highlighted portion, the channel-id is 0, the message-id is 0 (denoting that the header is a message header), the content-id is 0 (denoting XML encoding of the payload), the number of parameters is 0 (i.e., there are no parameters in the header) and the payload-length is 202.

The server then sends a response to the client to indicate whether the server can open a new session on the TCP connection. The following frame includes the response.

EXAMPLE 5D

Frame Including Response to initiateSession Operation Call

```
00 10 81 02 3C 3F 78 6D    6C 20 76 65 72 73 69 6F
6E 3D 22 31 2E 30 22 20    3F 3E 3C 53 3A 45 6E 76
65 6C 6F 70 65 20 78 6D    6C 6E 73 3A 53 3D 22 68
74 74 70 3A 2F 2F 73 63    68 65 6D 61 73 2E 78 6D
6C 73 6F 61 70 2E 6F 72    67 2F 73 6F 61 70 2F 65
6E 76 65 6C 6F 70 65 2F    22 3E 3C 53 3A 42 6F 64
79 3E 3C 6E 73 32 3A 69    6E 69 74 69 61 74 65 53
65 73 73 69 6F 6E 52 65    73 70 6F 6E 73 65 20 78
6D 6C 6E 73 3A 6E 73 32    3D 22 68 74 74 70 3A 2F
2F 73 65 72 76 69 63 65    63 68 61 6E 6E 65 6C 2E
74 63 70 2E 74 72 61 6E    73 70 6F 72 74 2E 77 73
2E 78 6D 6C 2E 73 75 6E    2E 63 6F 6D 2F 22 3E 3C
72 65 74 75 72 6E 3E ▓▓    3C 2F 72 65 74 75 72 6E
3E 3C 2F 6E 73 32 3A 69    6E 69 74 69 61 74 65 53
65 73 73 69 6F 6E 52 65    73 70 6F 6E 73 65 3E 3C
2F 53 3A 42 6F 64 79 3E    3C 2F 53 3A 45 6E 76 65
6C 6F 70 65 3E
```

Referring to Example 5D, the highlighted portion of the frame (specifically, a portion of the payload of the frame) indicates that a new session has been opened by the client on the TCP connection.

The client subsequently calls the openChannel operation and sends a listing of payload encoding schemes to the server. The following frame includes the listing of payload encoding schemes.

EXAMPLE 5E

Frame Including openChannel Operation and Listing of Payload Encoding Schemes

```
                     00    10 9E 04 3C 3F 78 6D 6C
20 76 65 72 73 69 6F 6E    3D 22 31 2E 30 22 20 3F
3E 3C 53 3A 45 6E 76 65    6C 6F 70 65 20 78 6D 6C
6E 73 3A 53 3D 22 68 74    74 70 3A 2F 2F 73 63 68
65 6D 61 73 2E 78 6D 6C    73 6F 61 70 2E 6F 72 67
2F 73 6F 61 70 2F 65 6E    76 65 6C 6F 70 65 2F 22
3E 3C 53 3A 3A 42 6F 64 79    3E 3C 6E 73 32 3A 6F 70
65 6E 43 68 61 6E 6E 65    6C 20 78 6D 6C 6E 73 3A
6E 73 32 3D 22 68 74 74    70 3A 2F 2F 73 65 72 76
69 63 65 63 68 61 6E 6E    65 6C 2E 74 63 70 2E 74
72 61 6E 73 70 6F 72 74    2E 77 73 2E 78 6D 6C 2E
73 75 6E 2E 63 6F 6D 2F    22 3E 3C 63 68 61 6E 6E
65 6C 53 65 74 74 69 6E    67 73 3E 3C 2F 63 68 61
74 69 61 74 65 64 4D 69    6D 65 54 79 70 65 73 3E
3C 6D 69 6D 65 54 79 70    65 3E ▓▓▓▓▓▓▓▓▓▓▓▓▓▓
▓▓▓▓▓▓▓▓▓▓▓▓▓▓▓▓    ▓▓▓▓▓▓▓▓▓▓▓▓▓▓▓▓
▓▓ 3C 2F 6D 69 6D 65 54    79 70 65 3E 3C 6D 69 6D
65 64 64 65 64 50 61 72    61 6D 73 2F 3E 3C 2F 6D
65 67 6F 74 69 61 74 65    64 4D 69 6D 65 54 79 70
65 73 3E 3C 74 61 72 67    65 74 57 65 62 53 65 72
74 63 70 3A 2F 2F 6C 6F    63 61 6C 68 6F 73 74 3A
35 37 37 37 33 2F 41 64    4E 75 6D 62 65 72 73 53
65 72 76 69 63 65 3E 3C    2F 74 61 72 67 65 74 57
73 50 6F 72 74 54 79 70    65 3C 2F 74 61 72 67 65
74 57 53 53 52 49 3E 3C    63 68 61 6E 6E 65 6C 49
64 3E 30 3C 2F 63 68 61    6E 6E 65 6C 49 64 3E 3C
77 73 53 65 72 76 69 63    65 4E 61 6D 65 20 78 6D
6C 6E 73 3A 6E 73 33 3D    22 68 74 74 70 3A 2F 2F
64 75 6B 65 2E 6F 72 67    22 3E 6E 73 33 3A 41 64
64 4E 75 6D 62 65 72 73    53 65 72 76 69 63 65 3C
2F 77 73 53 65 72 76 69    63 65 4E 61 6D 65 3E 3C
2F 63 68 61 6E 6E 65 6C    53 65 74 74 69 6E 67 73
3E 3C 2F 6E 73 32 3A 3A 6F    70 65 6E 43 68 61 6E 6E
65 6C 3E 3C 2F 53 3A 42    6F 64 79 3E 3C 2F 53 3A
45 6E 76 65 6C 6F 70 65    3E
```

Referring to Example 5E, the highlighted portions of the frame (specifically, a portion of the payload of the frame) indicate that (i) the client supports the Fast Infoset payload encoding scheme and (ii) the name of the Target Web Service is ns3:AddNumbersService.

If the server accepts the opening of a new virtual channel, the server then responds with a listing of commonly supported payload encoding schemes. The following frame includes the listing.

EXAMPLE 5F

Frame Including Listing of Commonly Supported Payload Encoding Schemes and Channel-Id

```
                     00    10 9C 04 3C
3F 78 6D 6C 20 76 65 72    73 69 6F 6E 3D 22 31 2E
30 22 20 3F 3E 3C 53 3A    45 6E 76 65 6C 6F 70 65
20 78 6D 6C 6E 73 3A 53    3D 22 68 74 74 70 3A 2F
2F 73 63 68 65 6D 61 73    2E 78 6D 6C 73 6F 61 70
2E 6F 72 2F 73 6F 61 61    70 2F 65 6E 76 65 6C 6F
70 65 2F 22 3E 3C 53 3A    42 6F 64 79 3E 3C 6E 73
32 3A 6F 70 65 6E 43 68    61 6E 6E 65 6C 52 65 73
70 6F 6E 73 65 20 78 6D    6C 6E 73 3A 6E 73 32 3D
22 68 74 74 70 3A 2F 2F    73 65 72 76 69 63 65 63
68 61 6E 6E 65 6C 2E 74    63 70 2E 74 72 61 6E 73
70 6F 72 74 2E 77 73 2E    78 6D 6C 2E 73 75 6E 2E
63 6F 6D 2F 22 3E 3C 72    65 74 75 72 6E 3E 3C 6E
65 67 6F 74 69 61 74 65    64 4D 69 6D 65 54 79 70
65 73 3E 3C 6D 69 6D 65    54 79 70 65 3E ▓▓ ▓▓ ▓▓
▓▓ ▓▓ ▓▓ ▓▓ ▓▓ 3C 2F 6D 69    6D 65 54 79 70 65 3E 3C
65 6D 62 65 64 64 65 64    50 61 72 61 6D 73 2F 3E
3C 2F 6E 65 67 6F 74 69    61 74 65 64 4D 69 6D 65
54 79 70 65 73 3E 3C 74    61 72 67 65 74 57 53 55
52 49 3E 74 63 70 3A 2F    2F 6C 6F 63 61 6C 68 6F
73 74 3A 35 37 37 33 2F    41 64 64 4E 75 6D 62 65
72 73 53 65 72 76 69 63    65 2F 41 64 64 4E 75 6D
62 65 72 73 50 6F 72 74    54 79 70 65 3C 2F 74 61
72 67 65 74 57 53 55 52    49 3E 3C 63 68 61 6E 6E
65 6C 49 64 3E ▓▓ 3C 2F    63 68 61 6E 6E 65 6C 49
64 3E 3C 77 73 53 65 72    76 69 63 65 4E 61 6D 65
20 78 6D 6C 6E 73 3A 6E    73 33 3D 22 68 74 74 70
3A 2F 2F 64 75 6B 65 2E    6F 72 67 22 3E 6E 73 33
3A 41 64 64 4E 75 6D 62    65 72 73 53 65 72 76 69
63 65 3C 2F 77 73 53 65    72 76 69 63 65 4E 61 6D
65 3E 3C 2F 72 65 74 75    72 6E 3E 3C 2F 6E 73 32
3A 6F 70 65 6E 43 68 61    6E 6E 65 6C 52 65 73 70
6F 6E 73 65 3E 3C 2F 53    3A 42 6F 64 79 3E 3C 2F
53 3A 45 6E 76 65 6C 6F    70 65 3E
```

Referring to Example 5F, the highlighted portions of the frame (specifically, a portion of the payload of the frame) indicate that (i) the client support the Fast Infoset payload encoding scheme and (ii) the channel-id for the virtual channel is 1.

At this stage, the client can now transmit frames over the virtual channel (as opposed to the service channel). Example 5G shows a frame sent over the virtual channel.

EXAMPLE 5G

Frame Sent Over the Virtual Channel to Server

```
         ▓▓ ▓▓ ▓▓ ▓▓ E0    00 00 01 00 38 CF 00 53
28 68 74 74 70 3A 2F 2F    73 63 68 65 6D 61 73 2E
78 6D 6C 73 6F 61 70 2E    6F 72 67 2F 73 6F 61 70
2F 65 6E 76 65 6C 6F 70    65 2F F0 3F 81 81 07 45
6E 76 65 6C 6F 70 65 3F    81 81 03 42 6F 64 79 38
CD 0E 68 74 74 70 3A 2F    2F 64 75 6B 65 2E 6F 72
67 F0 3D 82 09 61 64 64    4E 75 6D 62 65 72 73 3D
82 03 61 72 67 30 91 31    30 F0 3D 82 03 61 72 67
31 91 32 30 FF FF F0
```

Referring to Example 5G, the highlighted portion of the frame corresponds to the channel-id, header, and payload length. The remaining portion of the frame corresponds to the encoded payload. With respect to the highlighted portion, the channel-id is 1, the message-id is 0 (denoting that the header is a message header), the content-id is 4 (denoting Fast Infoset encoding of the payload), the number of parameters is 0 (i.e., there are no parameters in header), and the payload-length is 128. In this example, the payload includes a call to a web service hosted by the server.

The server subsequently replies to the client using the following frame.

EXAMPLE 5H

Frame Sent Over the Virtual Channel to Client

|  |  |  |  |  |  |  |  |  |  |  |  |  |  | E0 | 00 |
|---|---|---|---|---|---|---|---|---|---|---|---|---|---|---|---|
| 00 | 01 | 00 | 38 | CF | 00 | 53 | 28 | 68 | 74 | 74 | 70 | 3A | 2F | 2F | 73 |
| 63 | 68 | 65 | 6D | 61 | 73 | 2E | 78 | 6D | 6C | 73 | 6F | 61 | 70 | 2E | 6F |
| 72 | 67 | 2F | 73 | 6F | 61 | 70 | 2F | 65 | 6E | 76 | 65 | 6C | 6F | 70 | 65 |
| 2F | F0 | 3F | 81 | 81 | 07 | 45 | 6E | 76 | 65 | 6C | 6F | 70 | 65 | 3F | 81 |
| 81 | 03 | 42 | 6F | 64 | 79 | 38 | CD | 0E | 68 | 74 | 74 | 70 | 3A | 2F | 2F |
| 64 | 75 | 6B | 65 | 2E | 6F | 72 | 67 | F0 | 3D | 82 | 11 | 61 | 64 | 64 | 4E |
| 75 | 6D | 62 | 65 | 72 | 73 | 52 | 65 | 73 | 70 | 6F | 6E | 73 | 65 | 3D | 82 |
| 05 | 72 | 65 | 74 | 75 | 72 | 6E | 91 | 33 | 30 | FF | FF | F0 |  |  |  |

Referring to Example 5H, the highlighted portion of the frame corresponds to the channel-id, header, and payload length. The remaining portion of the frame corresponds to the encoded payload. With respect to the highlighted portion, the channel-id is 1, the message-id is 0 (denoting that the header is a message header), the content-id is 4 (denoting Fast Infoset encoding of the payload), the number of parameters is 0 (i.e., there are no parameters in header) and the payload-length is 127. In this example, the payload includes the response to the call made in Example 5G.

Those skilled in the art will appreciate that while the framing and connection management service, as described above, have been collectively referred to as an application layer protocol, the framing and connection management service may be operating in another layer in the computer. For example, the framing and connection management service may be operating in the transport layer.

Embodiments of the invention enable the efficient transfer of data over a network. For example, embodiments of the invention enable a 512 byte payload to be sent in a frame, where the frame includes a total metadata size of only 32 bits (i.e., 4 bytes). For example, assuming a channel-id=0, message-id=0 (denoting a message header), a content-id=0 (denoting XML encoding), a number of parameters=0 (i.e., no parameters) and a payload length=512 bytes, the following is the corresponding frame:

EXAMPLE 6

Example of a Frame 00000000 00000000 10000000 000001000 [512K Payload]

In addition, embodiments of the invention enable a single TCP connection to support multiple virtual channels, where each of the channels is associated with its own state. Further, the state may be modified over time and is persistent for the life of the virtual channel. In addition, the state includes information to enable more efficient encoding and/or decoding of the payloads in the frames.

Figure 5:
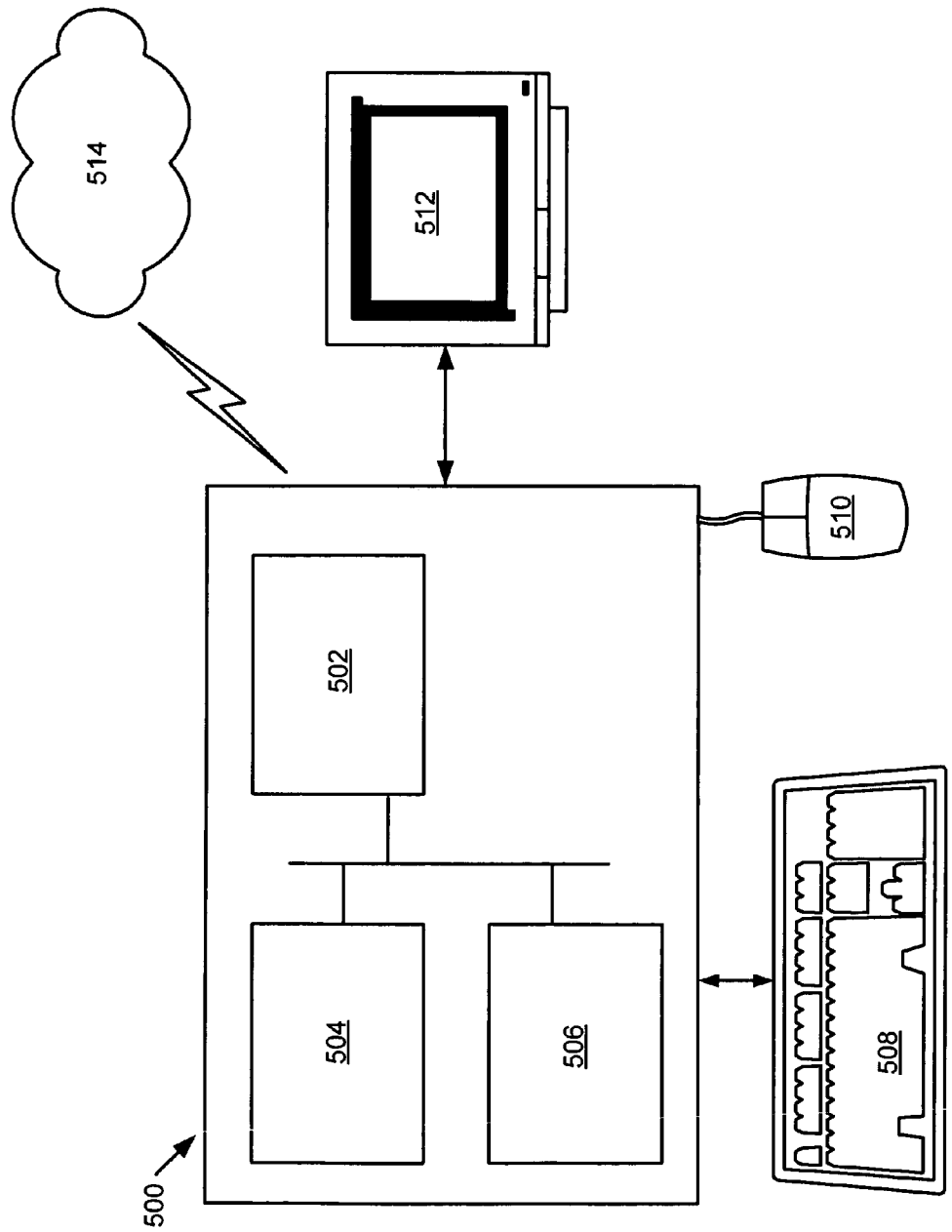
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., application layer, transport layer, network layer, etc) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting data comprising:
   receiving a first request to open a first virtual channel, wherein the first virtual channel is associated with a TCP connection and wherein the TCP connection is between a client and a server;
   negotiating, between the client and the server, a first payload encoding scheme to use on the first virtual channel in response to the first request;
   receiving a first frame from the client,
      wherein the first frame comprises a first channel-id and a first payload,
      wherein the first channel-id is associated with the first virtual channel, and
      wherein the first payload comprises a first datum encoded using the first payload encoding scheme;
   decoding the first payload to obtain a decoded first datum;
   processing the decoded first datum to obtain a second datum;
   generating a second frame,
      wherein the second frame comprises the first channel-id and a second payload, and
      wherein the second payload comprises the second datum encoded using the first payload encoding scheme; and
   sending the second frame to the client.

2. The method of claim 1, further comprising:
   receiving a second request to open a second virtual channel, wherein the second virtual channel is associated with the TCP connection;
   negotiating, between the client and the server, a second payload encoding scheme to use on the second virtual channel in response to the second request;

receiving a third frame from the client,
- wherein the third frame comprises a second channel-id and a third payload,
- wherein the second channel-id is associated with the second virtual channel, and
- wherein the third payload comprises a third datum encoded using the second payload encoding scheme;

decoding the third payload to obtain a decoded third datum;

processing the decoded third datum to obtain a fourth datum;

generating a fourth frame,
- wherein the fourth frame comprises the second channel-id and a fourth payload, and
- wherein the fourth payload comprises the fourth datum encoded using the second payload encoding scheme; and sending the fourth frame to the client.

3. The method of claim 2, wherein the first request and the second request are received over a service channel, wherein the service channel is a virtual channel associated with the TCP connection.

4. The method of claim 1, further comprising:
prior to receiving the first request:
receiving a framing version and a connection management service version from the client, wherein the framing version corresponds to the framing version currently supported by the client and the connection management service version corresponds to the connection management service version currently supported by the client;
determining whether framing version and the connection management service version are supported by the server;
closing the TCP connection if at least one selected from a group consisting of the framing version and the connection management service version are not supported by the server; and
receiving the first request if the framing version and the connection management service version are supported by the server.

5. The method of claim 1, wherein negotiating, between the client and the server, the first payload encoding scheme to use on the first virtual channel comprises:
receiving a first payload encoding schemes listing from the client;
obtaining a second payload encoding schemes listing from the server; and
determining at least one encoding scheme present in both the first payload encoding schemes listing and the second payload encoding schemes listing, wherein the at least one encoding scheme corresponds to the first payload encoding scheme.

6. The method of claim 1, wherein the first payload encoding scheme is Fast Infoset.

7. The method of claim 1, wherein the negotiating, between the client and the server, is performed using a Simple Object Access Protocol (SOAP)-based web service executing on the server.

8. A method for transmitting data, comprising:
receiving a first frame from a client,
- wherein the first frame consists of a channel-id, a first header, and a first payload component, and
- wherein the first payload component comprises a first payload;

determining a payload encoding scheme using the channel-id;

decoding the first payload to obtain a first decoded payload using the payload encoding scheme;

processing the first decoded payload to obtain a second payload;

encoding the second payload using the payload encoding scheme to obtain an encoded second payload;

generating a second frame,
- wherein the second frame consists of the channel-id, a second header, and a second payload component,
- wherein the second payload component comprises the encoded second payload; and sending the second frame to the client.

9. The method of claim 8, wherein the header comprises at least one selected from a group consisting of a message-id, a message-start-chunk-id, a message-chunk-id, a message-end-chunk-id, an error-id, and a null-id.

10. The method of claim 8, wherein the message header comprises a content description.

11. The method of claim 10, wherein the content description describes a charset used in the first decoded payload.

12. The method of claim 10, wherein the content description comprises a content-id and a parameter.

13. The method of claim 12, wherein the content description further comprises a number denoting a number of parameters in the content description.

14. The method of claim 12, wherein the parameter comprises a parameter-id and a parameter-value.

15. The method of claim 8, wherein the first payload component comprises a length of the first payload and the first payload.

16. The method of claim 8, wherein the first payload is decoded in an application layer of a server.

17. A method for transmitting data, comprising:
receiving, by a server, a first frame from a client,
- wherein the first frame comprises a channel-id, a header, and a payload component,
- wherein the payload component comprises a first payload,
- wherein the channel-id is associated with a virtual channel operating over a transport layer protocol,
- wherein the first payload is encoded using a payload encoding scheme associated with a state, and
- wherein the state is associated with the channel-id;

obtaining the state associated with the channel-id;

decoding the first payload to obtain a first decoded payload using the state;

processing the first decoded payload to obtain a second payload;

encoding the second payload using the payload encoding scheme defined in the state to obtain an encoded second payload;

generating a second frame, wherein the second frame comprises the encoded second payload; and sending the second frame to the client.

18. The method of claim 17, wherein the state comprises an encoding/decoding vocabulary, wherein the encoding/decoding vocabulary is used to decode the header in the first frame.

19. The method of claim 18, wherein the encoding/decoding vocabulary is generated during at least one selected from a group consisting of negotiation during opening of the virtual channel between the client and the server, prior to initiation of the negotiation to open the virtual channel between the client and the server, and after opening of the virtual channel between the client and the server.

20. The method of claim 19, wherein negotiation of the virtual channel between the client and the server is performed using a Simple Object Access Protocol (SOAP)-based web service executing on the server.

* * * * *

UNITED STATES PATENT AND TRADEMARK OFFICE
CERTIFICATE OF CORRECTION

PATENT NO. : 7,636,353 B2 Page 1 of 1
APPLICATION NO. : 11/635335
DATED : December 22, 2009
INVENTOR(S) : Sandoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Ninth Day of November, 2010

David J. Kappos
*Director of the United States Patent and Trademark Office*